United States Patent

[11] 3,575,269

| [72] | Inventor | Scott G. Sherman |
| | | Fort Worth, Tex. |
| [21] | Appl. No. | 857,404 |
| [22] | Filed | Sept. 12, 1969 |
| [45] | Patented | Apr. 20, 1971 |
| [73] | Assignee | Eagle Parts Co., Inc. |
| | | Fort Worth, Tex. |

[54] FLUID COUPLING
3 Claims, 4 Drawing Figs.

[52] U.S. Cl.................................................. 192/58R,
192/58B, 60/54, 64/26
[51] Int. Cl................................................... F16d 33/00
[50] Field of Search............................................ 192/58, 58
(A-1) (New 58A), 58 (A-2) (New 58B); 188/90
(A5), (Inquired); 64/26, 25, (Inquired);
123/41.11, (Inquired); 416/32 (Inquired), 169
(Inquired)

[56] References Cited
UNITED STATES PATENTS

| 3,002,595 | 10/1961 | Weir.............................. | 192/58A-2 |
| 3,059,745 | 10/1962 | Tauschek..................... | 192/58A-1 |
| 3,272,292 | 9/1966 | Sutaruk........................ | 192/58A-1 |
| 3,363,734 | 1/1968 | Sabat............................ | 192/58A-1 |
| 3,463,282 | 8/1969 | Fujita et al................... | - 192/58A-2 |

Primary Examiner—Edgar W. Geoghegan
Attorney—Herbert J. Brown

ABSTRACT: A fluid coupling of the type having relatively rotatable slightly spaced members operating in a viscous shear medium such as silicone fluid and whereby torque is transmitted from one member to the other at relatively low speeds. The present invention is characterized by indentations in one or both of the members where they face each other so as to entrap some of the fluid and thereby increase the shearing effect.

SCOTT G. SHERMAN
INVENTOR

BY Herbert J. Brown
ATTORNEY

FLUID COUPLING

This invention relates to fluid couplings of the type wherein torque is transmitted from a rotatable member to another by a viscous fluid such as liquid silicone. Particularly, the invention has reference to that type of coupling which transmits torque only at relatively low speeds, for example, driving a fan in conjunction with an internal combustion engine. In all couplings of the type referred to the transmission of torque depends on the shearing action of the fluid between the two rotatable members which are closely spaced. Heretofore, there were various proposals to increase the fluid shearing action such as by interfitting circular grooves in the opposing rotatable members or by multiple torque plates, both of which proposals were expensive to manufacture.

The primary object of the present invention is to provide an inexpensive fluid coupling of the described class yet one which is efficient in its operation.

A particular object of the invention is to provide indentations in a face of one or both of the rotatable members for entrapping some of the viscous fluid and thereby increasing the shearing and resulting torque action.

These and other objects of the invention will become apparent from the following description and the accompanying drawing, in which.

Figure 1:
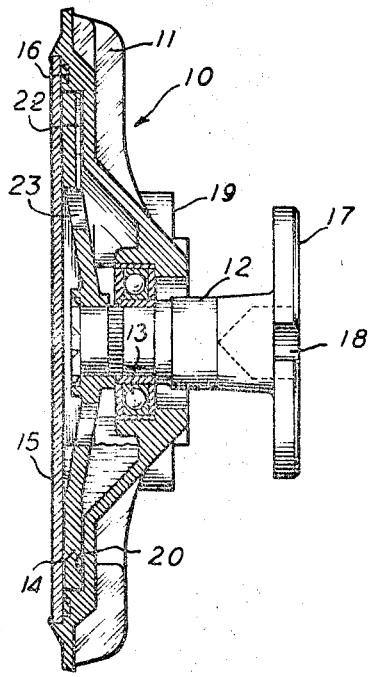
FIG. 1 is an axial sectional view of a fluid coupling according to the invention.
Figure 2:
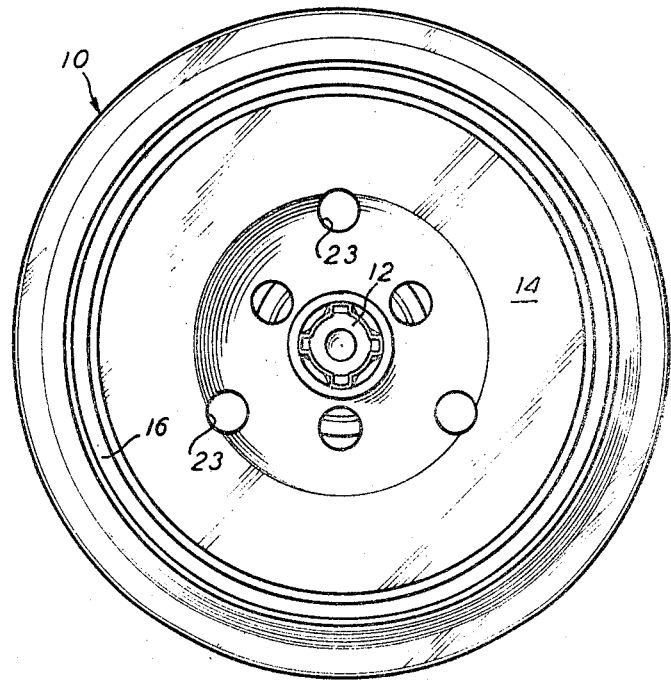
FIG. 2 is a rear view with the back cover removed.
Figure 4:
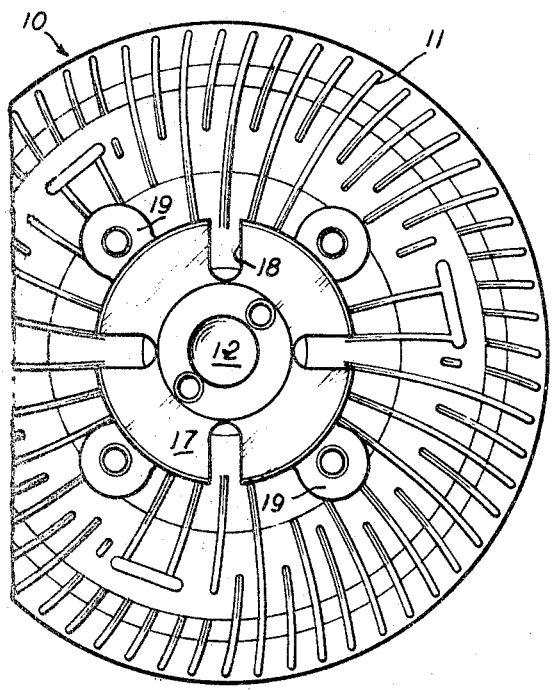
FIG. 4 is a broken front elevational view of the assembly first illustrated in FIG. 1.

The form of the invention shown includes a rotatable circular housing 10 having cooling fins 11 on its front surface. A shaft 12, in a bearing 13, extends into the housing 10 where it supports a rotor 14. The rotor 14 is staked on the shaft 12 for rigidity and economy of construction. There is a back cover 15 on the housing 10, crimped in place, and an O-ring seal 16 therearound. The forward end of the shaft 12 is flanged at 17 and the latter has radial slots 18 for connection with an accessory such as a water pump, not shown. Bosses 19 on the front of the housing 10 are tapped to receive a fan, not shown, or other component which may rotate about the axis of the coupling assembly.

Figure 3:
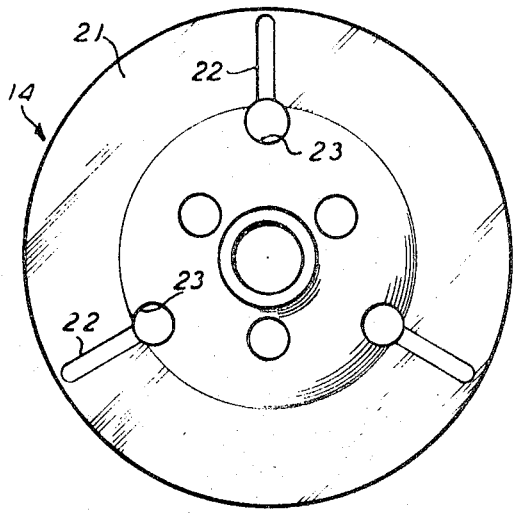
FIG. 3 is a front elevational view of the rotor.

Both the housing 10 and the rotor 14 have opposing circular and slightly spaced working surfaces 20 and 21. As best shown in FIG. 3, the working surface 21 of the rotor has indentations 22 in the form of radial slots, the ends of which are closed at their outer ends. In the preferred form of the invention there are openings 23 in the rotor 14, some of which communicate with the inner ends of the indentations 22 to provide a ready supply of viscous fluid, not numbered, in the housing 10.

In operation, input to the rotor 14 is through the shaft 12 by way of the water pump connecting flange 17. At high speeds, torque is not transferred by the fluid to the housing working surface 20 but because of slippage at lower speeds there is a fluid friction action which turns the housing 10. By reason of the entrapped fluid in the indentations 22 there is an increased fluid shearing or friction action and thus imparts a more positive torque transmission.

I claim:

1. A fluid coupling including a rotatable housing containing viscous fluid, an input shaft extending into said housing, a rotor rigidly mounted on the inner end of said shaft, said housing and said shaft having circular opposing working surfaces, and radially spaced indentations having continuously closed peripheries therearound in at least one of said working surfaces.

2. A fluid coupling as defined in claim 1 and wherein said indentations are comprised of radial slots about the axis of said working surfaces.

3. A fluid coupling as defined in claim 1 and wherein said rotor has openings therethrough, at least some of which communicate with the inner edges of said indentations relative to the axes of said working surfaces.